United States Patent [19]

Dalibout

[11] Patent Number: 4,493,246
[45] Date of Patent: Jan. 15, 1985

[54] BRAKE CYLINDER WITH TWO PISTONS

[75] Inventor: Georges Dalibout, Gagny, France

[73] Assignee: WABCO Westinghouse Equipements Ferroviaires, Freinville-Sevran, France

[21] Appl. No.: 395,071

[22] PCT Filed: Oct. 20, 1981

[86] PCT No.: PCT/FR81/00132
§ 371 Date: Jun. 21, 1982
§ 102(e) Date: Jun. 21, 1982

[87] PCT Pub. No.: WO82/01405
PCT Pub. Date: Apr. 29, 1982

[30] Foreign Application Priority Data

Oct. 21, 1980 [FR] France .................. 80 22449

[51] Int. Cl.$^3$ ............................................ F01B 9/00
[52] U.S. Cl. ................................. 92/13.8; 92/29;
92/32; 92/33; 92/63; 92/129; 92/165 PR;
188/196 P
[58] Field of Search ............... 92/13, 13.1, 13.6, 13.7,
92/29, 21 MR, 32, 33, 65, 129, 130 A, 165 PR,
13.8; 188/196 P

[56] References Cited

U.S. PATENT DOCUMENTS

| | | | |
|---|---|---|---|
| 2,974,646 | 3/1961 | Miller et al. | 92/33 |
| 3,704,653 | 12/1972 | Higgins | 92/29 |
| 3,722,637 | 3/1973 | Kershner | 188/196 P |
| 3,994,207 | 11/1976 | Ekdahl et al. | 92/29 |
| 4,019,426 | 4/1977 | Wosegien et al. | 92/129 |
| 4,063,622 | 12/1977 | Coleman et al. | 92/32 |
| 4,364,305 | 12/1982 | Dalibout et al. | 92/29 |
| 4,385,548 | 5/1983 | Persson et al. | 92/129 |

FOREIGN PATENT DOCUMENTS 2011416 2/1970 France .
2445251 7/1980 France .

OTHER PUBLICATIONS

*Girling Car Brake Actuation Equipment*, Lucas Girling Limited, England, 8/1/79.

Primary Examiner—Robert E. Garrett
Assistant Examiner—Richard S. Meyer
Attorney, Agent, or Firm—G. J. Falce

[57] ABSTRACT

A spring-applied, air-released parking/emergency brake is combined with an air-actuated service brake through a friction clutch between the parking/emergency brake piston and a first nut member that is threaded onto a screw rod of the service piston. The screw rod and service piston are connected through another friction clutch. The screw rod is provided with a second nut member that is integral with a thrust rod to which the brake rigging is connected. A friction lock slack adjuster arrangement limits retraction of the thrust rod during brake release in accordance with the desired brake shoe clearance to be maintained. When the thrust rod movement is inhibited by the slack adjuster, the service piston clutch becomes disengaged to permit rotation of the screw rod during the release stroke of the service piston corresponding to overtravel due to shoe wear. Brake shoe clearance is thus maintained constant. The service piston clutch is engaged during a service application so as to induce rotation of the first nut member, which is accordingly maintained at a given point of axial reference relative to the parking/emergency brake piston, so that the actuating spring force is constant any time the parking/emergency brake is activated.

6 Claims, 1 Drawing Figure

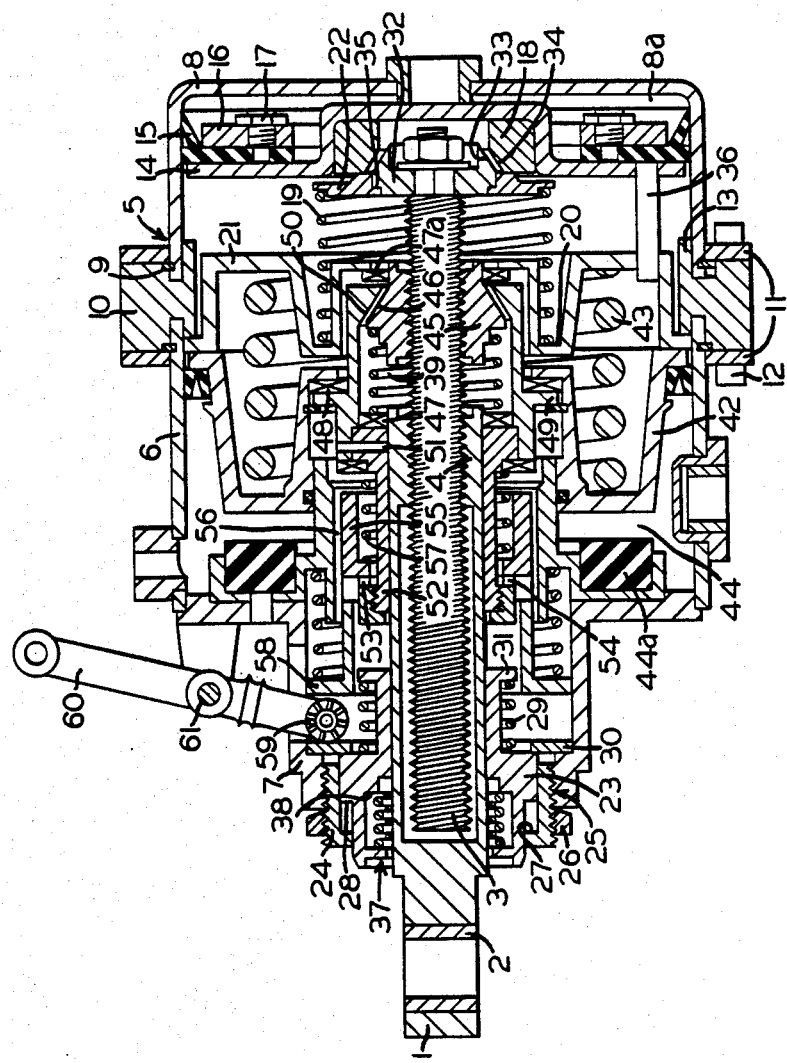

BRAKE CYLINDER WITH TWO PISTONS

BACKGROUND OF THE INVENTION

This invention concerns an air released, spring-applied brake cylinder of the type comprising a service or "duty" piston operated by the pressurized fluid, and a spring-applied brake piston (for the parking and/or emergency brake system), held in the "off" position by the pressure of the fluid acting in opposition to the reaction effort of the spring.

Existing spring type brakes comprise braking devices of the type in which a compressed-air service or "duty" brake is combined with a spring-applied brake, held in the "off" position by air pressure while the vehicle is in motion. A part from the risk of the spring-applied brake coming into action accidentally, if the air-pipe to the spring cylinder breaks, the main drawback of these combined brake systems, which otherwise offer very satisfactory regulation possibilities for the duty brake, lies in the fact that the reaction force of the spring operating the parking and emergency brake decreases rapidly as the spring is released. The distance the spring travels is often considerable, in order to take up the inevitable clearances that exist in the brake gear and between brake linings and brake surfaces, as well as the elasticity of the brake gear, as a result of the considerable forces which the linings exert on the brake surfaces. In many cases, it has been found, after several years' service, that the reaction force of the spring in such brakes, reduced by corrosion and creep affecting the spring steel, which remains under stress, reaches only between half and a third of the initial maximum design force, when in the braking position.

SUMMARY OF THE INVENTION

Methods of overcoming such drawbacks include avoiding keeping the spring under continuous compression. This has already been done, but is dangerous in that it reduces the reliability of the emergency braking system. Another method is to limit the travel of the spring when activated to apply the parking and/or emergency brake.

One of the purposes of this invention is to make more effective use of the reaction force of the prestressed spring, as known in the prior art, by using a nut threadedly fixed on the duty brake piston rod and having a clutch face engageable with a closely spaced, complimentary face of the spring piston to lock the nut against rotation in order to apply the spring brake force. Another purpose is to provide a brake cylinder comprising a duty brake piston and a spring-loaded brake piston, acting on the same brake gear, by means of a clearance adjuster common to both pistons, the said system forming a compact, reliable and inexpensive unit.

Accordingly, this new brake cylinder comprises a fluid-pressure actuated, spring-returned duty brake piston and a spring-actuated, fluid-pressure released parking and/or emergency brake piston. The spring piston is capable of transmitting all or part of the spring reaction force to the brake gear through a transmission surface on the spring-actuated parking brake piston, which is engageable with a nut member screwed to a screw-rod attached to the duty piston. The nut is held against a stop, which is to a certain degree fixed in relation to the cylinder casing, to thereby keep the nut, regardless of axial movements of the duty piston, at a short distance from the transmission surface, when the spring piston is in the extreme retracted position, under the effect of the releasing pressure, so that subsequent axial movement of the spring piton from its retracted position under the force of the actuating spring, by a distance greater than the said short distance, brings the transmission surface into contact with a corresponding contact surface on the nut, and locks it axially in relation to the screw-rod. The screw-rod is screwed on to another "take-up" nut on a duty brake piston clearance adjuster, this take-up nut being fixed, at least in the brake-operating position, to a rod which transmits the brake operating force.

The screw-rod, which must be carefully made from a tough material such as hardened steel, therefore cooperates with two nuts with different functions, thus making the cylinder mechanisms more reliable, and reducing their cost.

In one pratical aspect of the invention, the screw-rod is firstly, fixed to another transmission and locking surface, on which a corresponding surface of the duty brake piston can rest when it is operated. Secondly, the screw rod is pushed back by a release spring in the direction of the duty brake piston. Retraction of the transmission rod after application of the brake is confined to a "normal clearance" distance, which is shorter than the maximum possible travel of the duty brake, by means of movable stops, such as friction segments gripping the rod, so that, when these movable stops have moved on the transmission rod, return of the duty brake piston to its inactive position detaches the other transmission and locking surface from the combined duty brake piston surface, and that the screw-rod release spring moves this rod in the direction of the duty brake piston, causing it to rotate in relation to the take-up nut.

In another aspect of the invention, the duty brake piston is prevented from rotating in relation to the cylinder casing by at least one spindle passing through the wall separating the chamber containing the screw-rod release spring from the chamber containing the spring-actuated brake piston operating spring. This wall contains two concentric annular bosses, on one of which rests the duty brake piston release spring, while on the other, on the opposite side from the duty brake piston, rests the spring-actuated brake piston spring.

Preventing the duty brake piston from rotating improves locking of the adjuster when the cylinder, which may be subjected to intense vibrations, is in the release position.

The transmission surface on the spring piston may be fixed to a sleeve, which revolves freely on it, but which is locked to prevent it from rotating in relation to the cylinder casing by means of a dog clutch, consisting of a locking wheel with a tooth or teeth, or dog clutch or clutches, co-operating with another locking wheel of the same type, rotatably attached to the cylinder casing. This locking wheel is pushed by a release spring in a direction to effect toothed engagement of the dog clutches, with a manual release lever being hinged on the cylinder casing, for disengaging the dog clutches by forcing the locking wheel in opposition to its release spring in a direction away from the other locking wheel. Rotational unlocking of the teeth or dog-clutches of the locking wheels thereby releases the sleeve, and permits this coupling, engaged with the threaded nut member, to rotate, and consequently release the spring force. As a result of this free rotation of the nut member on the threads of the rod fixed to the duty piston, manual release of the spring actuated brake is accomplished.

According to another important feature of this invention, the dog-clutch system between the two locking wheels is uni-directional, preventing the sleeve and thus the threaded nut member from rotating in the direction encouraged by the force exerted on the nut by the spring piston, while the ratchet toothing on at least one of the locking wheels enables the sleeve to rotate in the other direction, pushing back the release spring of the other locking wheel, to permit retraction of the spring piston under the force of the release fluid pressure.

DESCRIPTION AND OPERATION

The following description will reveal other purposes, benefits and features of this invention, with reference to the accompanying drawing, containing a single cross-sectional view of this new brake cylinder.

This brake cylinder comprises a thrust-rod 1, one end of which has a cap containing an aperture 2 for attachment to the brake levers. Inside the brake cylinder, this thrust-rod 1 is hollow, containing a threaded rod 3, the threads of which co-operate with a nut 4, fixed to the rod 1. This rod 1 and the screw-rod 3 form part of a brake cylinder 5, the casing of which comprises a shell 6, enclosed by a cover 7 and a cylindrical end 8, connected to the shell 6 by keeper rings 9, an annular connecting ring 10 and two rings 11, held by bolts 12. The whole unit is made air-tight by hermetic seals cooperating with the part 13 of the connecting ring 10 that projects inside the cylinder. A duty brake piston 14 mounted movably inside the aperture in the casing end 8 is fitted with a sealing component 15, which is held in place in some appropriate fashion, for example by an annular clamping member 16 attached to piston 14 by bolts 17. The central part of the piston contains a boss one side of which faces in the direction of the cylinder supply coupling, and the opposite side of which is reinforced by a bush 18.

A spiral spring 19, biasing the piston 14 to the release position, is mounted to rest between a shoulder 20 on a separating wall 21 marking the boundary of the duty brake cylinder chamber, and a ring 22, in contact with the bush 18. An axially movable stop sleeve 23, is fitted to the thrust rod 1, between an adjustable stop socket 24 and a stop shoulder 30 of cover 7. Stop socket 24 is adjustable by being screw-threaded into an aperture 25 in the cover 7. The adjusted position is maintained by means of a locknut 26. The stop socket 24 has an annular inturned rim 27, with which a normally spaced-apart matching shoulder 28 on the stop sleeve 23 is engageable.

This sleeve is forced towards the right-hand side of the FIGURE by a release spring 29, located between the stop shoulder 30 resting on the cover, and a flange 31 on the sleeve 23 to establish the normal spaced-apart relationship between inturned rim 27 and shoulder 28.

A clutch head 32 is fitted to the right-hand end of the screw-rod 3. It comprises a tapering surface 33, which can come into contact with a matching tapering surface 34 on the bush 18 fixed to the duty piston 14, and a shoulder 35, on which the ring 22 comes to rest. In the release position shown in this FIGURE, the tapering surfaces 33 and 34 are spaced from each other, while the shoulder 35 rests on the ring 22. The duty brake piston 14 is prevented from rotating in relation to the cylinder casing by means of at least one spindle 36, which passes through the separating wall 21. The stop sleeve 23 carries a set of friction segments 37, which grip the polished outside surface of the thrust-rod, in opposition to the axial movement in relation to the sleeve 23. Each such segment may, for example, comprise a prestressed annular spring, which strongly grips a split ring mounted on the rod 1.

A rubber dust cover or the like (not shown) may be provided at the outlet of rod 1, to provent outside contamination from penetrating into the set of friction segments 37.

A spring-loaded brake piston 42 movably mounted inside the shell 6 of the braking cylinder 5, is subjected to the reaction force of a powerful prestressed spring 43 acting between the separating wall 21 and the right-hand face of piston 42. Acting on the left-hand side of the piston 42 in opposition to the spring force is the pressure of the fluid admitted into the brake chamber 44.

A mechanical connection between the duty brake 14 and parking brake 42 is provided by a nut 45 carrying a tapered portion 46 and with the same reversible threading as the nut 4, screwed on to the screw-rod 3. This nut 45 is forced in the direction of the duty piston 14, and is held in a fixed axial position against the wall 21, through the effect of a spring 39 resting on a ball thrust-bearing 47. The spring cylinder piston 42 is connected, by a thrust-bearing 48, to a sleeve 49, equipped with a tapered portion 50 adjacent tapered portion 46. Sleeve 49 is fixed by a pin 51 to a second sleeve 52 having a dog-clutch 53 in one-directional engagement with a matching dog-clutch 54 on a sleeve 55, which slides axially in grooves 56 forming part of the cover 7 of the cylinder 5. The sleeve 55 is forced in the direction of the dog-clutch 53 on sleeve 52 by a release spring 57 to normally maintain clutch engagement.

The brake system described above functions in the following way.

During normal service of a rail vehicle fitted with these new brake cylinders, the parking brake chamber 44 is supplied with compressed air at sufficient pressure to overcome spring 43 and maintain the spring-loaded piston 42 in the right-hand position against the cylinder end formed by separating wall 21.

When the duty brake is applied, the duty brake chamber 8a of the cylinder 8 is supplied with compressed air, and the duty piston 14 is forced in the left-hand direction, in opposition to the release spring 19.

The distance between the rim 27 and shoulder 28 is initially equal to the theoretical brake shoe clearance, regulated by the brake cylinder slack adjuster. The amount of such clearance can be selected by rotating the screw-socket 24, after loosening the locknut 26, and locking it again on the socket 24 after the socket has been adjusted.

As soon as the bush 18 begins to move towards the left-hand side of the FIGURE, it forces the ring 22 away from clutch head 32, whereby the tapered surface 34 presses against the tapered surface 33. Screw-rod 3 is thereby rotationally fixed to the duty piston 14, which is prevented from rotating by the spindles 36.

The screw-rod 3, prevented from rotating by the contact between tapered surfaces 33 and 34, moves towards the left, whereby the threaded connection of the screw-rod 3 with the nut 4 forces rod 1 leftward until the shoulder 28 of the sleeve 23 comes into contact with the inturned rim 27. Thereupon, the brakes are applied in the normal way, since any clearance that has appeared during the previous braking operation has been taken up. If braking continues, and significant wear on the brake linings and braking surfaces appears, the rod 1, in order to apply the brakes at full power, has to travel an additional distance, under the effect of the piston 14, subjected to the pneumatic pressure prevailing in the chamber 8a. During this additional travel, the sleeve 23 and friction segments 37, carried by sleeve 23 are prevented from axially moving with piston 14, and the outside surface of the rod 1 slides, with friction, relative to the segments 37.

While the duty brake piston 14 is moving to the left, the spring piston 42 is maintained in release position so as to not interfere with movement of piston 14. In this release position of piston 42, tapered surfaces 46 and 50 remain disengaged to allow the nut 45 to rotate, as it is held by spring 39 in a fixed axial position against separating wall 21 by means of a bearing 47a.

When the duty brake is released, the duty brake chamber 8a is connected to the exhaust outlet by a braking pressure distributor (not shown) and the duty piston 14 is forced towards the right-hand side of the FIGURE by its release spring 19. During this time, screw-rod 3 is prevented from turning due to tapered surfaces 33-34 being maintained in engagement with each other by reason of return spring 29 forcing sleeve 23 in the right-hand direction, whereby friction segments 37 carry rod 1 and, consequently, screw-rod 3 rightwardly also. Nut 45, which is held in a fixed axial position by engagement of its bearing 47a with wall 21, is caused to rotate in a direction opposite the direction of rotation during brake application to accommodate this axial displacement of screw-rod 3. After release travel corresponding to normal clearance, the sleeve 23 comes to a halt against the stop shoulder 30, and the friction segments 37 immobilize the rod 1. The release spring 19 thereupon forces the piston 14 in a right-hand direction by means of the ring 22, disengaging the tapered surfaces 33 and 34. The screw-rod 3 is then pushed to the right by the spring 19, causing screw-rod 3 to rotate in relation to the nut 4, to take up the additional clearance that has appeared as a result of wear on the brake shoes. The screw-rod 3 continues to rotate until the central boss of the duty piston 14 comes to a stop against the cylinder end 8, and the ring 22 comes into contact with the bush 18. The ring 22 also rests directly on the clutch head 32, rotationally fixed to the screw-rod 3, preventing the screw-rod 3 from rotating by friction, while keeping the tapered surfaces 33 and 34 at a distance from each other. Rotation of the screw-rod 3 under the effect of the release spring 19 has thereby taken up the additional clearance that has occurred during braking. In order to give clearance to the brake gear operated by the rod 1, this rod can be pushed in the direction of the duty piston 14, in opposition to the friction force exerted by segments 37. This axial displacement of rod 1 acts through the threaded connection of nut 4 to rotate screw-rod 3, by overcoming the friction between ring 22 and clutch head 32.

The spring-loaded parking or emergency brake is applied after application of brakes by the duty brake to maximum pressure, in order to take up all clearances, as well as the elasticity of the brake gear, and of all components subjected to brake-application forces.

In order to apply the parking brake, the pressure in the chamber 44, is released via the exhaust outlet, thereby enabling the piston 42, under the pressure of the spring 43, to move to the left. When the two tapered portions 46 and 50 have come into contact, the reaction force of the spring 43 is transmitted to the nut 45. Engagement of the tapered portions 46 and 50 prevents nut 45 from rotating, so that the spring force is transmitted from nut 45 to rod 3 and thence to the nut 4 and thrust-rod 1. Since the duty brake piston has already been applied, it will be apparent that the parking/emergency brake piston will only move a distance corresponding to the spacing between tapered surfaces 46 and 50. It will be noted that the distance between the righthand end of sleeve 55 and the adjacent end of sleeve 58 is greater than the space between tapered surfaces 46 and 50. Spring 57 thus remains caged between these sleeve members to maintain tooth engagement between dog clutches 53 and 54.

At this time, the one-way action of dog clutches 53-54 and the connection of grooves 56 on the sleeve 55, with corresponding splines on the cylinder casing prevent rotation of the sleeve 49, which sleeve is fixed to the screw 3 by the engagement of tapered portions 46 and 50. The pneumatic brake can then be released, since the spring-loaded brake is applied as parking brake with approximately the same strength as the duty brake at maximum pressure.

The spring-loaded brake is released by raising the pressure in the chamber 44. The spring piston 42 moves toward the right, taking sleeve 49 along, whereby the connected tapered portions 46 and 50 are separated with bearing 47a of the nut 45 abutting wall 21. Return spring 19 is effective to force screw-rod 3 to the right as nut 45 rotates. When the screw-rod 3 stops its movement to the right, spring piston 42 continues its movement alone, until it reaches its right-hand stop against separating wall 21.

If the spring-loaded brake chamber is accidentally exhausted, for example, if the pipe supplying pressure to chamber 44 breaks, the spring piston 42 moves to the left and takes up the clearance between tapered portions 46 and 50 to effect engagement therebetween. Nut 45 is thus locked against rotation and accordingly pulls the screw-rod 3 in the left-hand direction. The sleeve 55 slides along the grooves 56, also to the left, under the force of the spring 57, but comes to a stop against a sleeve 58, itself resting on a wheel 59 of a hand-operated spring-brake release lever 60, before the piston 42 has been able to apply the brake shoes to the braking surface. The one-way dog clutches 53 and 54 are disengaged as sleeve 52 continues to move with piston 42 until the piston reaches its left-hand stop 44a on the cylinder casing 5. This disengagement of the dog clutches 53 and 54 thus allows nut 45 to rotate so that return spring 19 is effective to force ring 22 and thus screw-rod 3 in a right-hand direction until the piston 14 comes to rest against its right-hand stop on the cylinder end 8, and the thrust rod 1 is subject to no further reaction force to the right. Thus, no brake force is transmitted to the brake rigging via thrust rod 1.

When the parking brake has been accidentally operated, the spring-loaded brake is reset automatically, by repressurizing the spring chamber 44 in the normal way, after repairs to the brake pipe have been carried out. Pressurizing chamber 44 forces piston 42 towards its right-hand stop, whereby tapered portions 46 and 50 are disengaged to permit nut 45 to rotate under the influence of spring 39 in a direction to cause axial displacement along screw-rod 3 in a right-hand direction until the bearing 47a on nut 45 engages separating wall 21. In this position, dog clutches 53 and 54 are re-engaged and the parking brake is thus reset ready for further use.

The parking brake can be released manually, as follows. When the parking brake has been applied, the spring chamber 44 is connected to the atmosphere, and the reaction force of the spring 43 has replaced the pneumatic pressure on the duty piston 14 while in service. Without any supply of air to release the brake pneumatically, the vehicle is immobilized in a braked position. Operating the lever 60 by hand causes it to pivot on its hinge axis 61 on the cover 7, pushing the wheel 59 to the right-hand side of the FIGURE. Under the pressure of this wheel 59, the sleeve 58 moves to the right, until it comes into contact with the sleeve 55, which slides along the grooves 56, and disengages the dog clutches 53 and 54. The reaction force of the brake gear pushes the rod 1 to the right, so that the sleeve 49, thereby fixed to the nut 45, begins to rotate, to enable the spring piston 42 to come into contact with its left-hand stop 44a, and the screw-rod 3 to rotate, enabling the piston 14 to withdraw until it reaches its stop on the cylinder end 8. As soon as the operator stops pulling the lever 60, the sleeve 58 is pushed back to the left by its release spring 57, and the dog clutches 53 and 54 come back into contact, under the pressure of the spring 57. The brake can be reset by repressurizing the chamber 44, in order to push back the piston 42.

As the piston 42 is moving to the right, the nut 45 can rotate freely, taking along the sleeve 49, since the dog clutches 53 and 54 ratchet over each other, thus allowing the nut 45 to rotate in the opposite direction to that for application of the parking/emergency brake.

Naturally, this invention is in no way confined to the embodiments described and illustrated here. Many variations will be available to someone skilled in the art, depending on the use made of the invention, without any departure from the spirit of the invention. For example, other types of slack adjuster, with a reversible-thread screw, can be used in combination with the nut 45 to reset the spring-loaded brake.

What is claimed is:

1. A brake cylinder device comprising:
  (a) a casing;
  (b) a duty brake piston subject on one side thereof to the force of fluid pressure urging movement of said duty brake piston in a brake application direction;
  (c) a screw-threaded rod;
  (d) a non-rotatable thrust rod having an integral first nut member threadedly connected to said screw rod;
  (e) first clutch means between said duty brake piston and said screw rod for locking said screw rod against rotation upon clutch engagement in response to movement of said duty brake piston in a brake application direction and for unlocking said screw rod upon clutch disengagement in response to movement of said duty brake piston in a brake release direction to thereby free said screw rod to rotate;
  (f) means for urging said screw rod and said duty brake piston in said brake release direction;
  (g) slack adjuster means for limiting axial displacement of said thrust rod in said brake release direction a predetermined distance, whereby continued axial displacement of said screw rod in said brake release direction corresponding to overtravel of said duty piston during said brake application induces rotation of said screw rod relative to said first nut member in a direction to effect lengthening of the axial dimension between said screw rod and said thrust rod;
  (h) a parking/emergency brake piston subject on one side to the force of a spring urging movement thereof in said brake application direction, and subject on the opposite side to the force of fluid pressure normally sufficient to overcome the force of said spring to maintain said parking/emergency brake piston in a brake release position,
  (i) a second nut member threadedly disposed on said screw rod for rotation thereon;
  (j) second clutch means for inhibiting rotation of said second nut member during movement of said parking/emergency brake piston in said brake application direction to lock said second nut member axially in relation to said screw rod, such that the force of said spring acting through said parking/emergency brake piston is transmitted to said thrust rod, said second clutch means including:
    (i) a first sleeve member that is connected to said parking/emergency brake piston in such a manner as to be rotatable relative thereto, said first sleeve member including a force transmitting surface; and
    (ii) a force receiving surface formed on said second nut member so as to be engageable with said force transmitting surface upon movement of said parking/emergency brake piston in said brake application direction to effect said locking of said second nut member;
  (k) means for limiting axial movement of said second nut member relative to said parking/emergency brake piston so as to maintain a predetermined spacing between said force transmitting and receiving surfaces irrespective of the stroke of said duty brake piston, whereby the degree of expansion of said parking/emergency brake piston spring and thus the force exerted thereby on said one side of said parking/emergency brake piston is constant for a given reduction of fluid pressure from said opposite side of said parking/emergency brake piston;
  (l) third clutch means normally having engagement for rotatably locking said first sleeve member against rotation; and
  (m) means for effecting disengagement of said third clutch means upon movement of said parking/emergency brake piston in said brake application direction a distance exceeding said predetermined spacing between said force transmitting and receiving surfaces, thereby permitting said second nut member and said first sleeve member to rotate relative to said screw rod under the thrust of said spring, the direction of rotation being such as to permit said parking/emergency brake piston to be moved axially into engagement with an end stop on the casing of said brake cylinder device to thereby cage said spring and accordingly relieve the spring force from said thrust rod.

2. A brake cylinder device as recited in claim 1, further comprising means for preventing rotation of said duty brake piston relative to the casing of said brake cylinder device.

3. A brake cylinder device as recited in claim 1, wherein said third clutch means comprises:
  (a) a second axially movable sleeve member carried on the casing of said brake cylinder device concentrically with said first sleeve member and having a plurality of teeth around the one face thereof;

(b) said first sleeve member including a gear ring having teeth arranged to interact with said teeth of said second sleeve member;

(c) a spring caged between said first and second sleeve members to urge toothed engagement therebetween; and (d) said means for effecting disengagement of said third clutch means including stop means for limiting axial movement of said second sleeve member in a brake application direction upon movement of said parking/emergency brake piston said distance exceeding said predetermined spacing between said force transmitting and receiving surfaces, whereby said teeth of said gear ring and said second sleeve member are separated to effect said disengagement of said third clutch means.

4. A brake cylinder device as recited in claim 3, wherein said stop means comprises:

(a) a manually operable lever having an actuating end supported in one direction of movement by the casing of said brake cylinder device;

(b) a third sleeve member having one end axially spaced from said one face of said second sleeve member said distance in excess of said predetermined spacing and;

(c) a spring biasing said third sleeve into engagement with said actuating end of said manually operable lever, whereby movement of said manually operable lever in a direction opposite said one direction effects axial displacement of said third sleeve member against said bias spring toward engagement with second sleeve member to separate said teeth of said gear ring and said second sleeve member and thereby effect said disengagement of said third clutch means.

5. A brake cylinder device as recited in claim 4, wherein said distance in excess of said predetermined spacing is less than said predetermined distance.

6. A brake cylinder device as recited in claim 4, wherein said locking of said third clutch means is in a single direction of rotation, whereby said first sleeve member and said second nut member are free to rotate in the opposite direction of said locking when said third clutch means is engaged.

* * * * *